United States Patent
Cros et al.

(10) Patent No.: US 7,579,738 B2
(45) Date of Patent: Aug. 25, 2009

(54) MULTI-PHASE ELECTRICAL MOTOR FOR USE IN A WHEEL

(75) Inventors: Jérôme Cros, Sainte-Foy (CA); Denis Matte, Sainte-Foy (CA); Philippe Viarouge, Sainte-Foy (CA)

(73) Assignee: Greenee Energy Inc., Québec (CA)

( * ) Notice: Subject to any disclaimer, the term of this patent is extended or adjusted under 35 U.S.C. 154(b) by 446 days.

(21) Appl. No.: 11/261,524

(22) Filed: Oct. 31, 2005

(65) Prior Publication Data

US 2007/0096586 A1    May 3, 2007

(51) Int. Cl.
    *H02K 1/00* (2006.01)
(52) U.S. Cl. ......................... 310/216; 310/254
(58) Field of Classification Search ............ 310/216, 310/254, 145, 185
    See application file for complete search history.

(56) References Cited

U.S. PATENT DOCUMENTS

| | | |
|---|---|---|
| 3,740,600 A | 6/1973 | Turley |
| 3,812,928 A | 5/1974 | Rockwell et al. |
| 3,930,683 A | 1/1976 | MacKeown |
| 4,043,374 A | 8/1977 | Smith |
| 4,315,171 A | 2/1982 | Schaeffer |
| 4,424,463 A | 1/1984 | Musil |
| 4,719,378 A | 1/1988 | Katsuma et al. |
| 4,754,207 A | 6/1988 | Heidelberg et al. |
| 4,774,428 A | 9/1988 | Konecny |
| 4,775,813 A | 10/1988 | Janson |
| 5,006,745 A | 4/1991 | Nishio et al. |
| 5,057,731 A * | 10/1991 | Hancock ............... 310/180 |
| 5,355,039 A | 10/1994 | Couture |
| 5,545,936 A | 8/1996 | Davenport |
| 5,675,196 A | 10/1997 | Huang et al. |
| 5,691,584 A | 11/1997 | Toida et al. |
| 5,894,902 A | 4/1999 | Cho |
| 6,095,617 A | 8/2000 | Bertetti |
| 6,278,216 B1 | 8/2001 | Li |
| 6,300,702 B1 | 10/2001 | Jack et al. |

(Continued)

FOREIGN PATENT DOCUMENTS

WO    WO 99/54985    10/1999

(Continued)

OTHER PUBLICATIONS

J. Cros, P. Viarouge, << *Synthesis of high performance PM motors with concentrated windings*>>, IEEE Trans. On Energy Conversion, vol. 17 No. 2, Jun. 2002.

(Continued)

*Primary Examiner*—Nguyen N Hanh
(74) *Attorney, Agent, or Firm*—Isabelle Chabot; Ogilvy Renault LLP

(57) ABSTRACT

The invention relates to a rotary multi-phase electrical motor wherein stator teeth corresponding to one same phase are grouped on a distinct and magnetically isolated stator section. The number of teeth per stator section is an odd number of a value of at least three and the difference between the total number of stator teeth and the number of rotor permanent magnet poles is one. The teeth are preferably equidistantly distributed along the stator. The invention also relates to a wheel motor using the rotary multi-phase electrical motor described above.

10 Claims, 7 Drawing Sheets

U.S. PATENT DOCUMENTS

| | | |
|---|---|---|
| 6,369,483 B1 * | 4/2002 | Hill .......................... 310/216 |
| 6,380,646 B1 | 4/2002 | Bernauer et al. |
| 6,384,496 B1 | 5/2002 | Pyntikov et al. |
| 6,492,756 B1 | 12/2002 | Maslov et al. |
| 6,646,363 B2 | 11/2003 | Kylander et al. |
| 6,661,137 B2 | 12/2003 | Gauthier |
| 6,784,586 B2 | 8/2004 | Akemakou |
| 6,836,036 B2 | 12/2004 | Dubé |
| 6,844,653 B2 | 1/2005 | Kolomeitsev et al. |
| 6,891,304 B1 | 5/2005 | Cros et al. |
| 6,949,864 B2 | 9/2005 | Maslov et al. |
| 2003/0015360 A1 | 1/2003 | Villeneuve |
| 2003/0098628 A1 | 5/2003 | Enomoto et al. |
| 2003/0214197 A1 | 11/2003 | De Luca et al. |
| 2003/0217878 A1 | 11/2003 | Etzioni et al. |
| 2004/0080223 A1 | 4/2004 | Shimizu |
| 2004/0212259 A1 | 10/2004 | Gould |
| 2005/0046304 A1 * | 3/2005 | Tamaki et al. ............... 310/254 |
| 2005/0099086 A1 | 5/2005 | Schunk et al. |

FOREIGN PATENT DOCUMENTS

| | | |
|---|---|---|
| WO | WO 01/48890 | 7/2001 |

OTHER PUBLICATIONS

Kenneth H. Rosen, "Elementary Number Theory and its applications", 4th edition, May 2000, p. 31.

* cited by examiner

MULTI-PHASE ELECTRICAL MOTOR FOR USE IN A WHEEL

BACKGROUND OF THE INVENTION

1) Field of the Invention

The invention relates to rotary brushless electrical motors. More particularly, the invention relates to a motor having magnetically isolated stator sections.

2) Description of the Prior Art

In traditional configurations of brushless electrical motors having a stator with coiled stator teeth and a rotor with permanent magnet poles, coils are driven by multiple phases and phases overlap one another on stator teeth. U.S. Pat. No. 4,774,428 to Konecny describes a rotary motor configuration where coils driven by the same phase are grouped on proximate teeth to occupy one distinct portion of the stator. Konecny explains that this phase grouping reduces electromagnetic torque ripple and increases starting torque per unit of volume of wire. This motor have a single stator magnetic circuit with teeth substantially equidistantly distributed. In this winding configuration, one coil is wound around each tooth.

Konecny teaches a rule for selecting the number of stator teeth and rotor poles that minimizes the magnitude of cogging torque for a three-phase motor having a single stator magnetic circuit. The number of stator teeth is given by $3(2n+1)$ and the number of rotor permanent magnets by $3(2n+1)\pm1$, where n is a positive integer.

U.S. Pat. No. 4,754,207 to Heidelberg, U.S. Pat. No. 6,384,496 to Pyntikov et al. and U.S. Pat. No. 6,492,756 to Maslov et al. expose the advantages of isolating each phase group of coils into separate sections. Magnetic material of each stator section is magnetically isolated from the other sections and each section carries coils driven by the same phase. Isolation of magnetic circuit of each phase reduces mutual inductance between phases and cyclic inductance.

U.S. Pat. No. 4,754,207 to Heidelberg et al. presents a motor configuration wherein adjacent stator teeth are grouped into sections, each section holding one phase. Heidelberg teaches a motor configuration wherein the angular distance between adjacent stator teeth within one section is equal to the angular distance between the rotor permanent magnets and the angular distance between adjacent stator teeth belonging to distinct adjacent sections is 1.6 times the distance between adjacent poles within one section.

Previous configurations of brushless electrical motor with stator sections present somewhat high magnitude of cogging torque which causes undesirable motor vibrations. There is thus a need for a simply constructed electrical motor with low magnitude of cogging torque which the prior arts have not completely fulfilled.

SUMMARY OF THE INVENTION

It is an object of the invention to provide a rotary mutiphase electrical motor that overcomes at least some of the inconveniences of the prior art.

One aspect of the invention is to provide a rotary multi-phase electrical motor with magnetically isolated stator sections wherein the number of stator teeth on each stator section is an odd number of a value of at least three and the difference between the total number of stator teeth and the number of permanent magnets is one.

Another aspect of the invention provides a rotary multi-phase electrical motor comprising: a first element having teeth disposed in a circular array along the first element, proximate teeth being grouped into at least three magnetically isolated sections, each section having an equal number of teeth, and phases, wherein a number of sections is a multiple of a number of phases, wherein each section holds only one phase; and a second element having magnets disposed in a circular array along the second element; wherein the first element and the second element are concentrically mounted for rotation thereof relative to each other, the array of teeth facing the array of magnets with a constant air-gap; wherein a number of teeth on each section is an odd number of a value of at least three and a difference between a total number of teeth and a number of magnets is one.

Another aspect of the invention provides a rotary multi-phase electrical motor comprising: a first element having teeth disposed in a circular array along the first element, proximate teeth being grouped into a number s of magnetically isolated sections, each section having a number q of teeth, and a number p of phases, the number p being of a value of at least three, wherein s is a multiple of p; wherein each section holds only one phase; and a second element having a number m of magnets disposed in a circular array along the second element; wherein the first element and the second element are concentrically mounted for rotation thereof relative to each other, the array of electromagnet poles facing the array of magnets with a constant air-gap; wherein the number q is equal to $(2n+1)$, where n is a positive integer; and the number m is equal to $s(2n+1)\pm1$.

Another aspect of the invention provides a wheel motor comprising: a first element having teeth disposed in a circular array along the first element, proximate teeth being grouped into at least three magnetically isolated sections, each section having an equal number of teeth, and phases, wherein a number of sections is a multiple of a number of phases, wherein each section holds only one phase; and a second element having magnets disposed in a circular array along the second element; and a wheel frame for concentrically mounting the first element and the second element and allowing rotation thereof relative to each other, the array of electromagnet poles facing the array of magnets with a constant air-gap; wherein a number of teeth on each section is an odd number of at least three and a difference between a total number of teeth and a number of magnets is one.

Another aspect of the invention provides a rotary multi-phase electrical motor comprising: a first element having teeth equidistantly disposed in a circular array along the first element, proximate teeth being grouped into at least three magnetically isolated sections, each section having an equal number of teeth, and phases, wherein a number of sections is a multiple of a number of phases, wherein each section holds only one phase; and a second element having magnets equidistantly disposed in a circular array along the second element; wherein the first element and the second element are concentrically mounted for rotation thereof relative to each other, the array of teeth facing the array of magnets with a constant air-gap.

Another aspect of the invention provides a rotary multi-phase electrical motor comprising: a first element having teeth equidistantly disposed in a circular array along the first element, proximate teeth being grouped into at least three magnetically isolated sections, each section having an equal number of teeth, and phases, wherein a number of sections is a multiple of a number of phases, wherein each section holds only one phase; and a second element having magnets equidistantly disposed in a circular array along the second element; wherein the first element and the second element are concentrically mounted for rotation thereof relative to each other, the array of teeth facing the array of magnets with a constant air-gap; wherein a number of teeth on each section is an odd number of a value of at least three and a difference between a total number of teeth and a number of magnets is one.

The invention relates to a rotary multi-phase electrical motor wherein stator teeth corresponding to one same phase are grouped on a distinct and magnetically isolated stator section. The number of teeth per stator section is an odd number of a value of at least three and the difference between the total number of stator teeth and the number of rotor permanent magnet poles is one. The teeth are preferably equidistantly distributed along the stator. The invention also relates to a wheel motor using the rotary multi-phase electrical motor described above.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
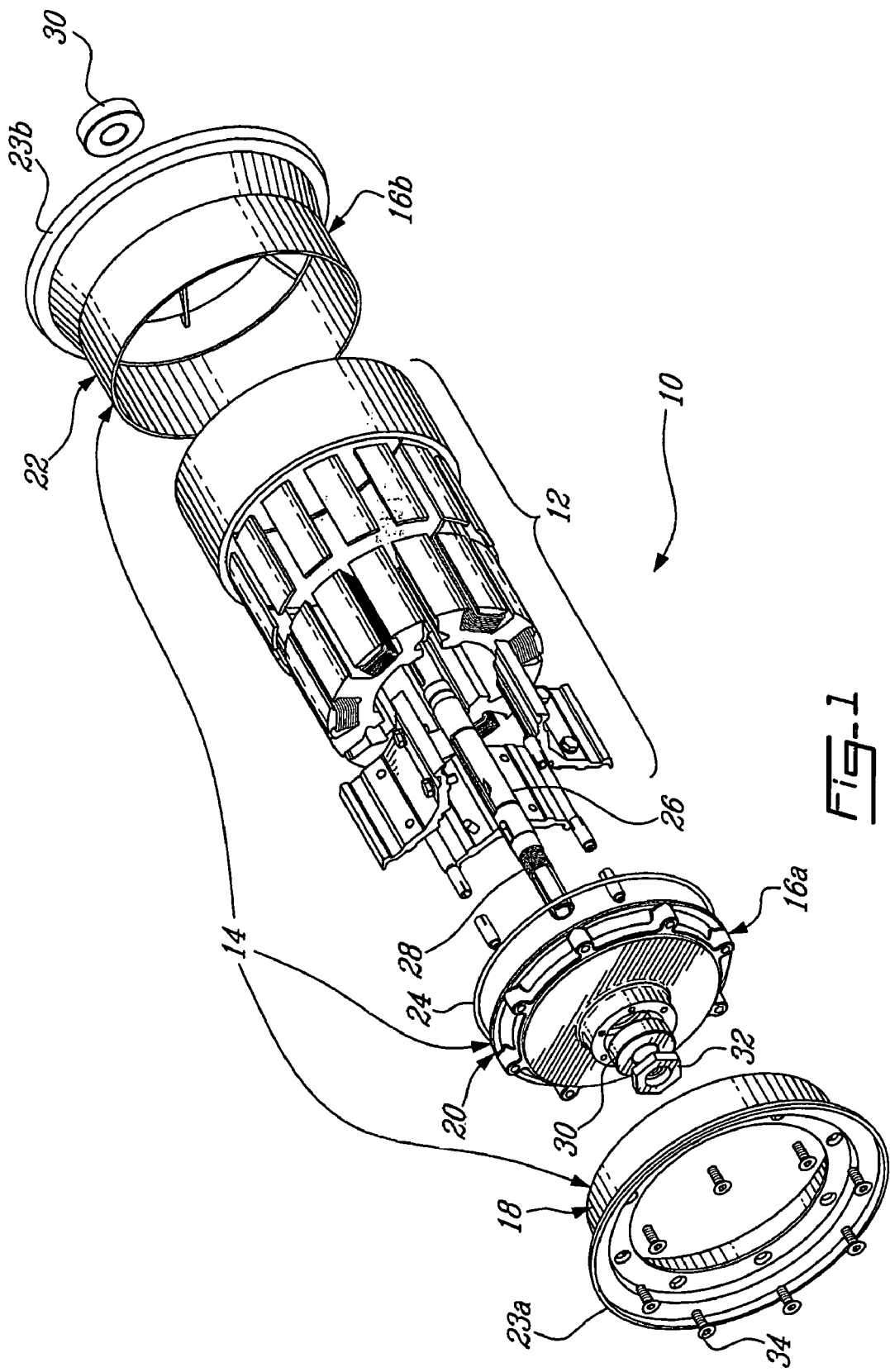
FIG. 1 is an exploded perspective view of a wheel motor according to an embodiment of the invention.

Referring to the drawings, FIG. 1 illustrates a wheel motor 10 for driving a vehicle. The wheel motor 10 is rotatively powered by a rotary electrical motor 12 encased in a wheel frame, which is in this case a demountable rim 14. The demountable rim 14 and the electrical motor 12 are both mounted on a main static shaft 26 that connects the wheel motor 10 to a vehicle.

The demountable rim 14 mainly consists of a motor casing 16a, 16b and a removable outer rim 18 that can be removed from the casing outwardly relative to the vehicle. The motor casing 16a, 16b is composed of an inner rim 22 and a cover 20 that fit together to enclose and protect the electrical motor 12. The demountable rim 14 is designed to bear a pneumatic tire using the cooperating inner rim 22 and removable outer rim 18, as illustrated on FIG. 3.

Figure 2:
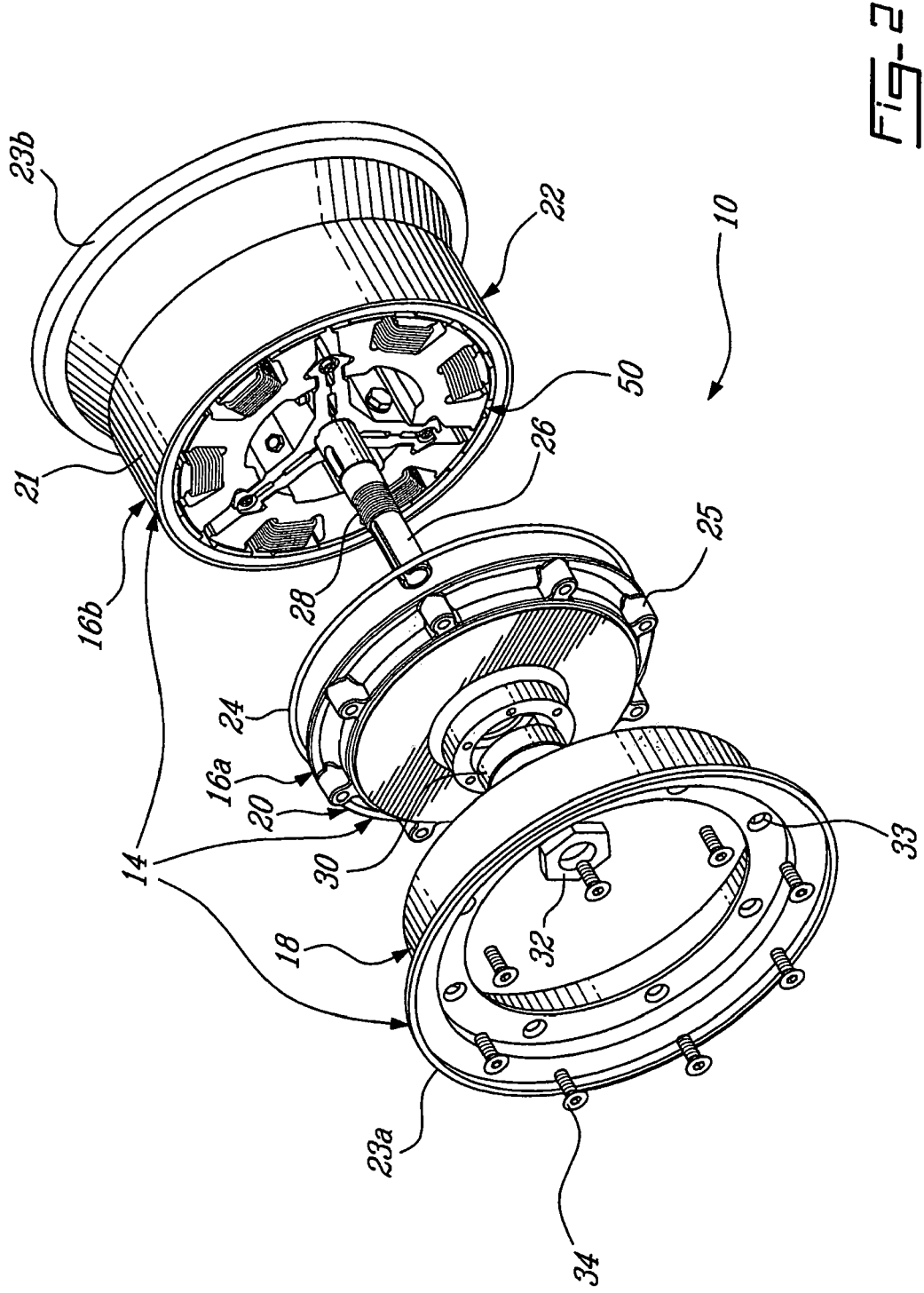
FIG. 2 is a perspective view of the wheel motor of FIG. 1 wherein the electrical motor is shown assembled and a demountable rim is shown exploded.

In FIG. 2, the electrical motor 12 is shown assembled and encased in the casing. The demountable rim 14 including the motor casing 16a, 16b and the removable outer rim 18, is made using thermally conductive material which in this case is permanent mold aluminum. The inner rim 22 consist of a tube 21 with a rim flange 23b and a closing disk (not shown) on its inner end relative to the vehicle. The cover 20 is an aluminum disk with eight peripherally distributed internal threads 25 for fastening the removable outer rim 18 thereon.

The cover 20 seats on the outer side of the inner rim 22 with an o-ring 24 therebetween to create a sealed motor casing 16a, 16b. The sealed casing 16a, 16b shields the electrical motor 12 located inside from water, dust and other exterior stresses. The o-ring 24 also ensures pneumatic tire airtightness as will be discussed later.

The rotating casing 16a, 16b is assembled using the static shaft 26 having a thread 28 at its outer end. Each of the inner rim 22 and the cover 20 fits on the static shaft 26 using a ball bearing 30 (best shown on FIG. 1) to allow its rotation on the shaft 26. A locking nut 32 is screwed on the shaft thread 28 and squeezes the cover 20 on the inner rim 22, between the locking nut 32 and a retaining ring (not shown). The casing is thus closed and sealed.

The removable outer rim 18 is an aluminum member in the shape of a crown comprising an outer rim flange 23a and eight peripherally distributed chamfered holes 33 corresponding to the casing internal threads 25 for affixing the removable outer rim 18 to the casing 16a, 16b with screws 34. The removable outer rim 18 and the casing 16a, 16b compose the demountable rim 14 for holding a tire.

Figure 3:
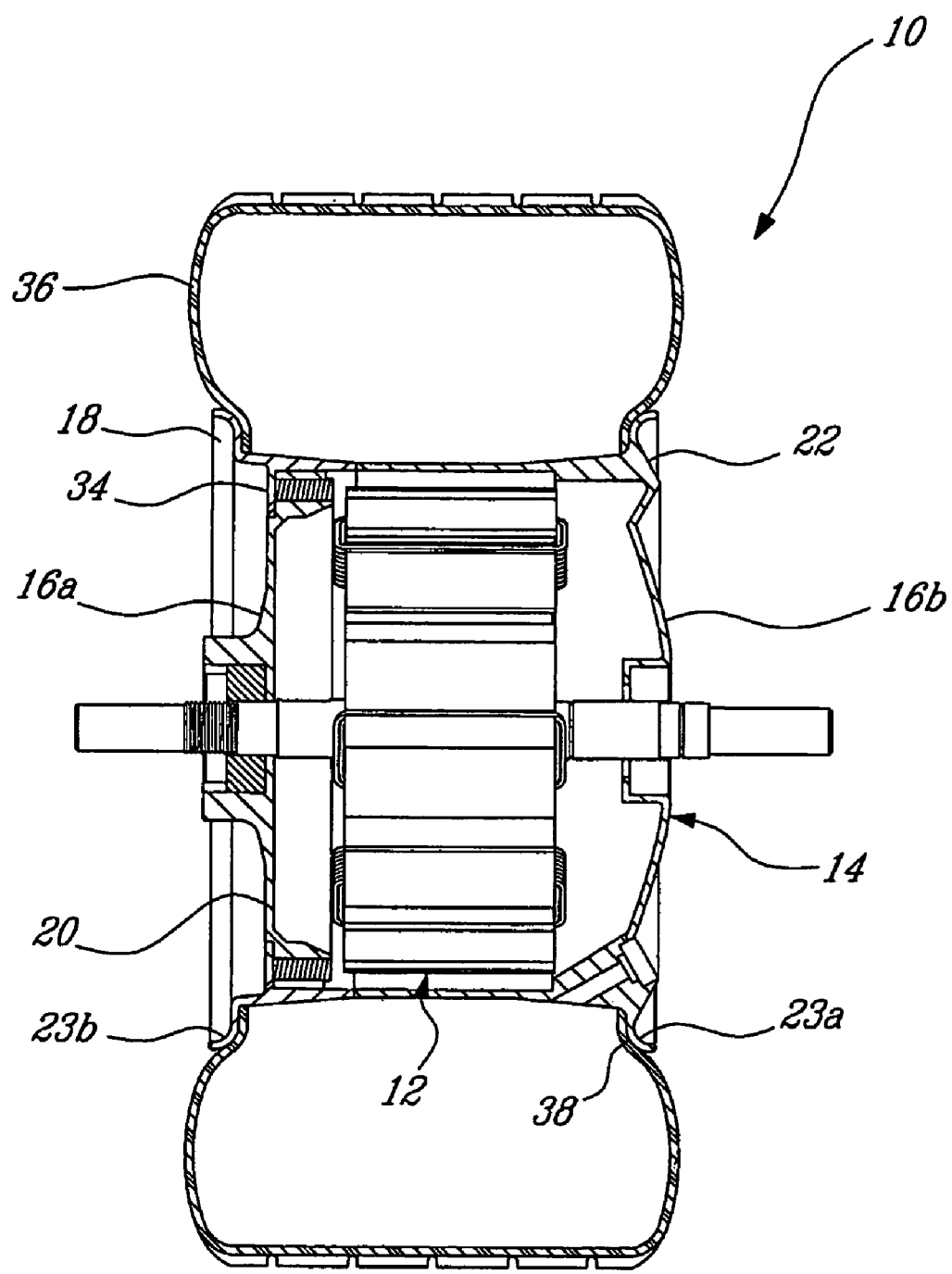
FIG. 3 is a cross-sectional view of the wheel motor of FIG. 1 showing a tire mounted on the demountable rim.

In FIG. 3, the wheel motor 10 is shown completely assembled and the demountable rim 14 holds a pneumatic tire 36. Tire 38 sits on the cooperating inner rim 22 and removable outer rim 18. The tire beads 38 are tightly held inside the two cooperating rim flanges 23a and 23b which secure the tire 36 in place. The o-ring 24 ensures airtightness between the inner rim 22 and the removable outer rim 18. In standard configurations of tire rims, which are not generally demountable, replacement of a tire requires the use of a special equipment to stretch the tire beads and to disassemble the tire from the rim. The wheel has to be removed from the vehicle for its installation on the special equipment. The fact that the rim is demountable facilitates removal of the tire 36 from the rim by detaching the removable outer rim 18. By unscrewing the screws 34, the removable outer rim 18 separates from the casing 16a, 16b and frees the tire 36 that can simply be removed by slipping it out of the inner rim 22 (see FIG. 2). The demountable rim 14 allows replacement of the tire 36 without removing the wheel motor 10 from the vehicle. During tire replacement, the electrical motor 12 stays unexposed and protected by the casing 16a, 16b.

One skilled in the art would understand that the demountable rim 14 members including the removable outer rim 18, the cover 20 and the inner rim 22, preferably made of aluminum, could be made of any suitable thermally conductive material offering sufficient mechanical strength for construction of a wheel such as aluminum alloys, steel or stainless steel.

Figure 4:
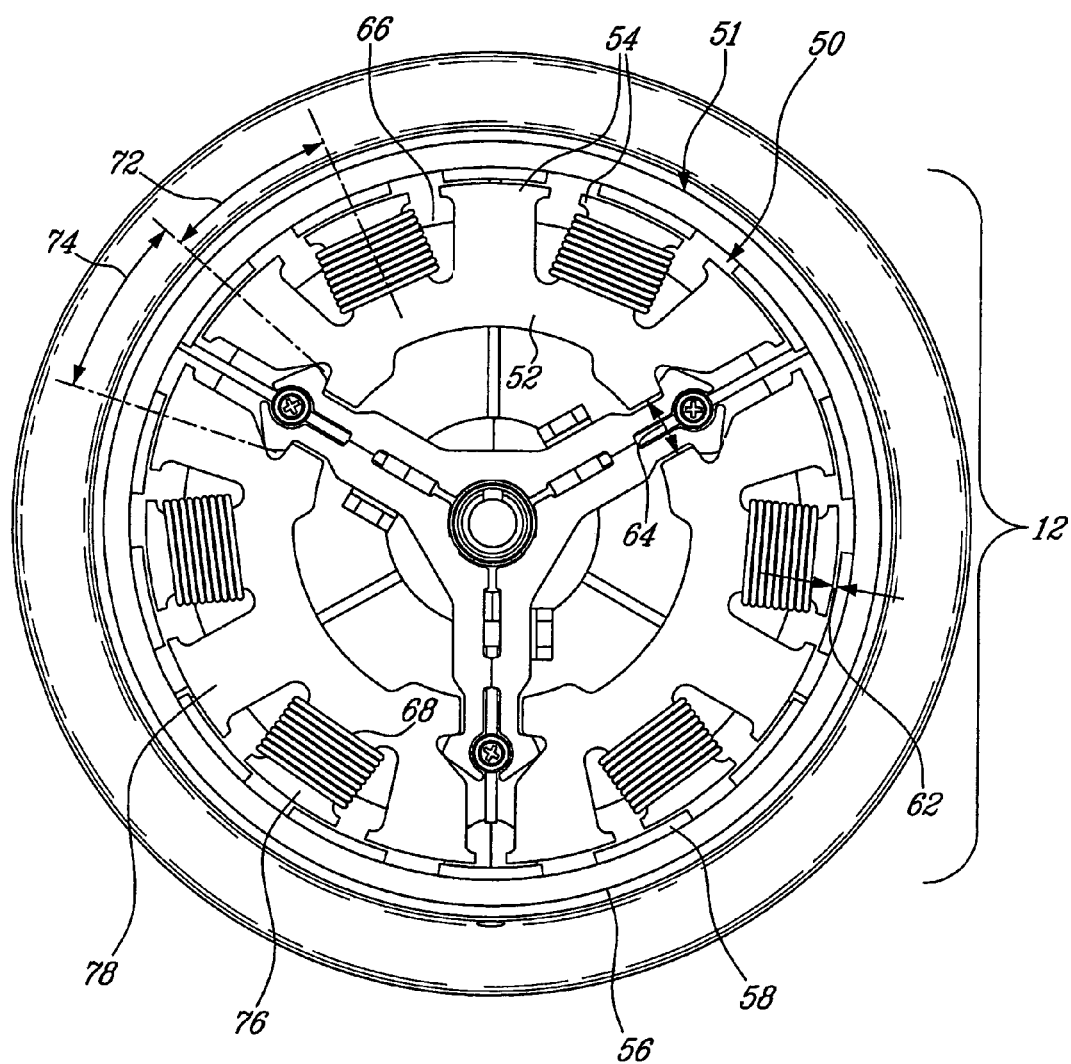
FIG. 4 is a cross-sectional view of the wheel motor of FIG. 1 wherein an electrical motor is evidenced.

Now referring to FIG. 4 showing the electrical motor, the electrical motor 12 is a three-phase motor comprising a stator 50 with stator teeth 54 and a rotor 51 with permanent magnet poles 58. The stator 50 is composed of three identical stator ring sections 52 which in this case are made using pressed ferromagnetic powder. The three stator sections are arranged to create an annular stator 50 and spaced with an isolation air-gap 64 between each two adjacent sections for magnetic isolation of the stator sections 52 relative to each other. On one stator section 52, five stator teeth are separated by four axially extending slots 66. The angular distance between each two adjacent stator teeth belonging to two adjacent stator sections, the angular section-to-section tooth distance 66, is equal to the distance between two adjacent stator teeth within one stator section, the angular intrasection tooth distance 64. The stator 50 thus comprises a total of fifteen equidistantly circumferentially distributed stator teeth 54. The rotor 51 comprises of a rotor ring structure 56 and fourteen permanent magnet poles 58. The rotor ring structure 56 is a steel tube.

The permanent magnet poles 58 are equidistantly arranged in a circular array and glued to the internal surface of the rotor ring structure 56, the polarity of the permanent magnet poles 58 being alternated. The rotor 51 surrounds the stator 50 with an even radial rotor-to-stator air-gap 62.

Two stator teeth, the coiled teeth 76, of each stator section 52 each holds one copper wire coil 68. The three remaining stator teeth are uncoiled teeth 78. Each coil is coiled around one coiled tooth 76 within a pair of adjacent slots 66 located immediately on each side of the coiled tooth 76. The coiled teeth 76 and the uncoiled teeth 78 alternate so that each of the four slots 66 bears one side of one coil 68. The stator teeth located at each end of each stator section are uncoiled. If consecutive numbers are attributed to consecutive stator teeth of each stator section, the coiled teeth 76 are stator teeth number 2 and 4 and the uncoiled teeth 78 are stator teeth 1, 3, and 5.

Figure 5:
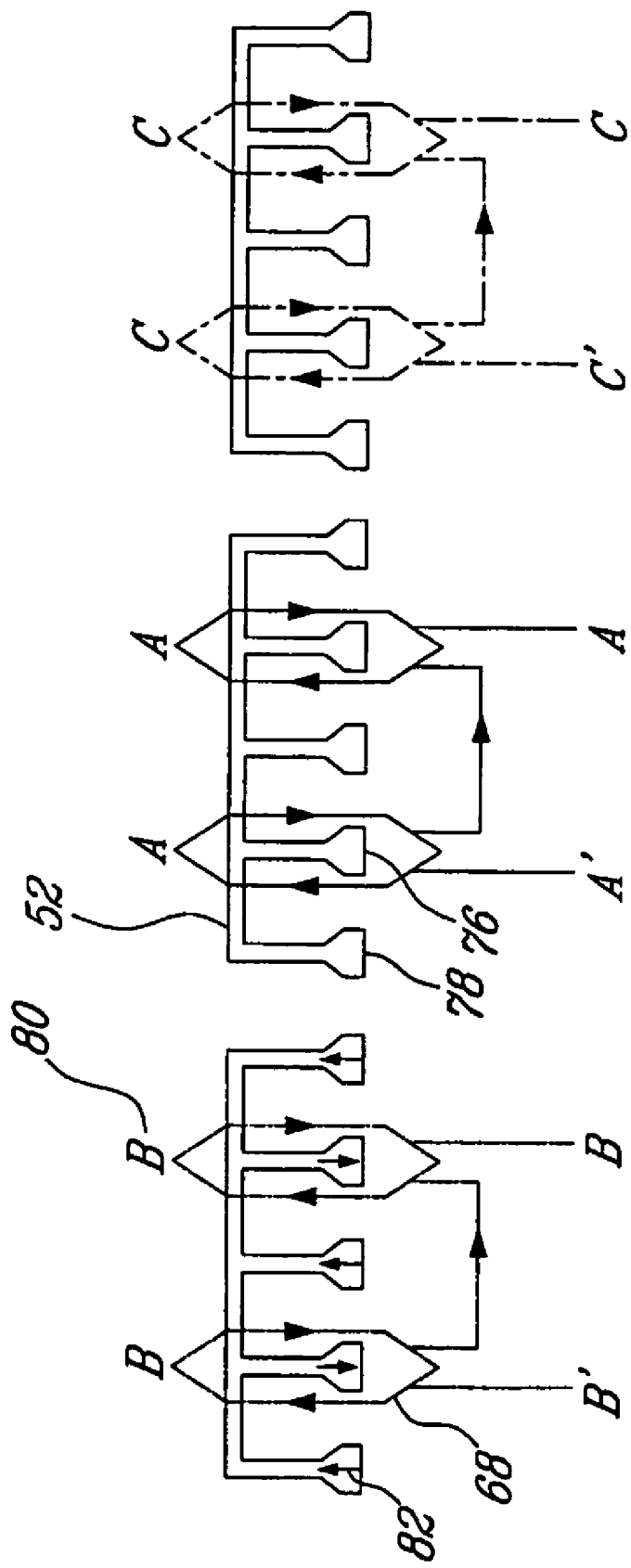
FIG. 5 is a schematic diagram of a three-phase winding configuration.

FIG. 5 illustrates a three-phase winding configuration of the electrical motor. Three phases 80 are referenced by letters A, B and C. All the coils 68 of each stator section 52 are driven by the same phase 80 so that each stator section 52 corresponds to one distinct phase 80. One stator section is driven by phase A, one by phase B and one by phase C. In the disclosed configuration, alternate stator teeth on each stator sections 52 are coiled, the coiled teeth 76 (stator teeth number 2 and 4), thus leaving three uncoiled teeth 78 (stator teeth number 1, 3 and 5). Every coil 68 has an electrical current of the same spin direction and the electrical current creates magnetic flux on the stator teeth 54 in such a way that electromagnet polarities 82 alternate on the stator teeth 54 of each stator section 52.

The electrical motor 12 (FIG. 1) is driven using electronically generated alternating currents. Three driving currents of the same shape but with a relative 120-degree phase shift compose the three-phase driving signals. The current shape may be square, rectangular or sinusoidal. Electronic frequency variation of the signals allows for control of the rotation speed of the motor. Motor torque is adjusted by varying current magnitude. As with synchronous motors, rotation speed is related to driving signal frequency and to the number of rotor magnetic poles.

The number of driving phases of the electrical motor is preferably three, thus providing a three-phase electrical motor. Without departing from the scope of the invention, the number of driving phases of the electrical motor as exemplified on FIG. 4 could be of any number greater or equal to three as long as the number of stator sections is a equal to or a multiple of the number of driving phases. If the number of stator sections is a multiple of the number of phases, multiple stator sections hold stator teeth driven by the same phase and the phases follow in sequence on the stator sections.

Two main classes of windings are possible for construction of multi-phase electrical motors, overlapping and non overlapping windings. In overlapping windings, coils are wound around multiple stator teeth and are overlapping each other. In non overlapping windings, each coil is wound around one single stator tooth using a pair of adjacent slots located immediately on each side of the stator tooth. Non overlapping windings offer the benefits of reducing the volume of copper specifically in the case of motor with small axial length, of reducing Joule losses and of improving motor efficiency. Motors using a non overlapping winding are also easier to manufacture. The described embodiment of the invention uses a non overlapping winding.

The selection of the combination of the number of stator teeth 54 and the number of rotor permanent magnet poles 58 has an effect on the magnitude of the cogging torque. A configuration wherein the number of stator teeth per phase is an odd number of a value of at least three and wherein the difference between the number of stator teeth and the number of rotor permanent magnet poles is one minimizes the magnitude of the cogging torque. The described embodiment uses a three-phase configuration with five stator teeth 54 per phase and fourteen permanent magnet poles 58. As an example, a configuration with a five-phase winding and with seven stator teeth per phase and thirty-six permanent magnet poles would also be appropriate.

A configuration where coils driven by the same phase are grouped to occupy one distinct portion of the stator increases starting torque per unit of volume of wire. Furthermore, division of the stator into magnetically isolated sections, each section holding coils driven by the same phase, have further benefits. Spacing of stator sections with isolation air-gaps between adjacent sections isolates magnetic circuit of each phase, reducing undesirable mutual electromagnetic inductance between adjacent phases and cyclic inductance. A stator construction with one separate section for each driving phase also offers the benefit of easy manufacturing and maintenance since the winding of each phase can be mounted before assembling the stator and it become possible to remove or replace only the defective section for motor maintenance.

A configuration with no windings on alternated stator teeth of each stator section simplifies again the manufacturing of the electrical motor and reduces undesirable mutual electromagnetic inductance between the stator sections and result in better current regulation and torque control. One skilled in the art would understand that winding of the inner stator teeth of each section, leaving only one uncoiled tooth at each end of each section, or winding of all the teeth of each section would still meet the object of the invention.

The angular section-to-section tooth distance 66 has an effect on the magnitude of the cogging torque of the electrical motor. In order to minimize the magnitude of the cogging torque, the angular section-to-section tooth distance 66 is chosen to be equal to the angular intrasection tooth distance 64, thus providing equidistant distribution of the stator teeth 54. One skilled in the art would understand that a different intrasection tooth distance would still be functional but would result in higher magnitude of cogging torque.

Without departing from the scope of the invention, one skilled in the art would understand that with no important modification in the configuration of the electrical motor the rotor and the stator could be inverted so that the rotor would rotate inside the stator. The rotating part could also be the one carrying the teeth so that the rotor would be divided in rotor sections with teeth and the stator would have permanent magnet poles.

The electrical motor 121 could also be constructed modularly by axially stacking stator section modules and rotor ring structure modules. Stator section modules would then be molded using the same mold and the desired number of section modules would be stacked on the shaft to obtain the required motor length. Six stator section modules could be used to create a three-section stator. Construction of the rotor would than use two stacked rotor ring structure modules. This modular construction of the electrical motor gives more flexibility on motor power adjustment. The greater number of stacked modules, the more motor power.

Figure 6:
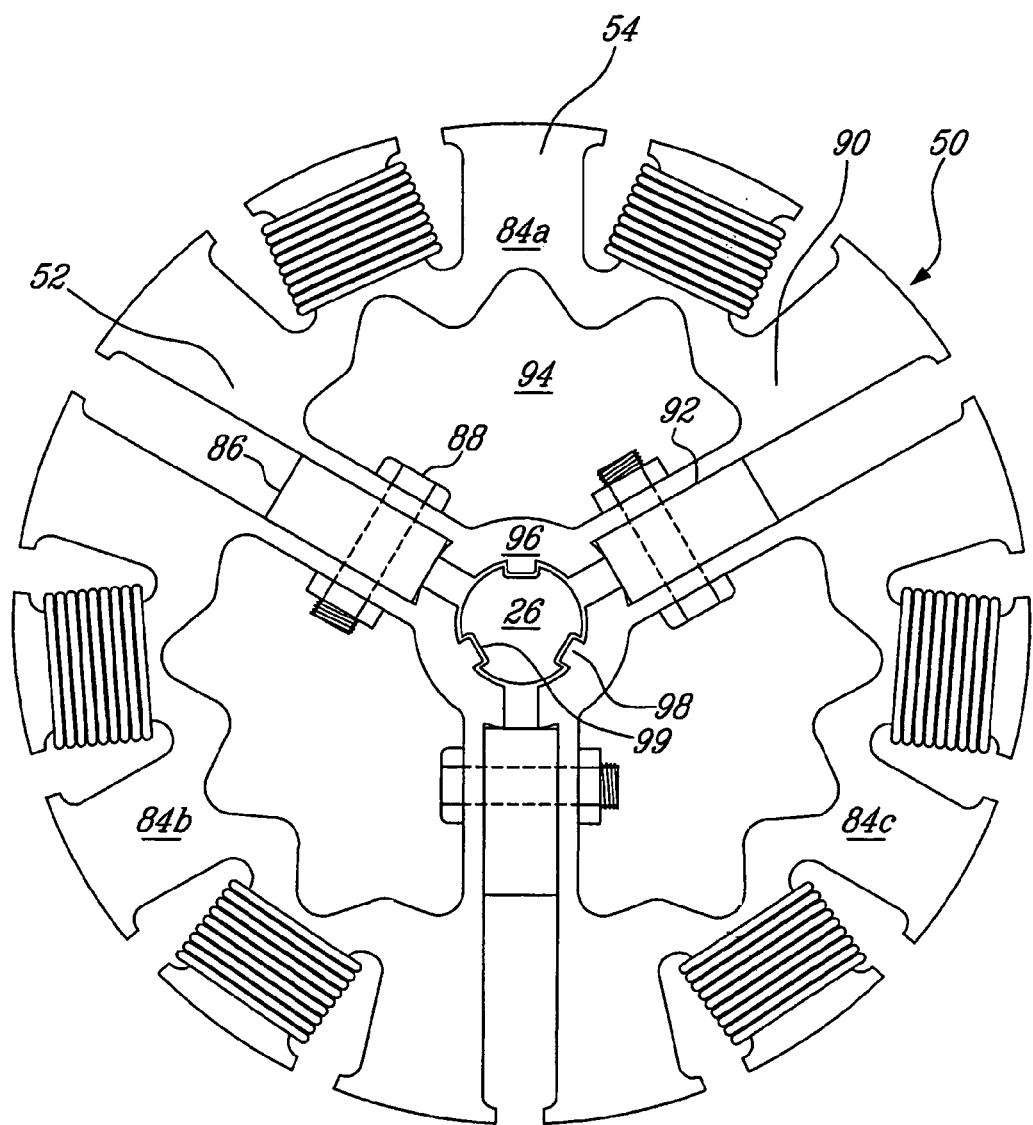
FIG. 6 is a cross-sectional view of a stator assembly using stator members including assembling features, according to one embodiment of the invention.

FIG. 6 depicts a stator assembly using three identical stator members 86a,86b,86c including assembling features. One aspect of the present invention is the division of the stator 50 into three magnetically isolated stator sections 52. Magnetic isolation is performed by creating an isolation air-gap 64 between each adjacent stator sections which minimizes leakage flux. In one embodiment of the invention, the stator 50 comprises three identical stator members 84a,84b,84c, each one consisting of one stator section 52, disposed to create a cylindrical stator 50. The three stator members 84a,84b,84c include assembling features for fastening the stator sections 52 together and on the central shaft 26 while maintaining an isolation air-gap 64 between adjacent stator sections 52 using three isolation spacers 86.

Each stator member 84a is a piece of pressed ferromagnetic powder comprising a 120-degree external arc 90 holding five stator teeth 54 and a 120-degree internal arc 96 located close to the central axis. The external arc 90 and the internal arc 96 are joint together with two radially extending side panels 92. A back panel 94 joins the external arc 90, the two side panels 92 and the internal arc 96 for higher mechanical strength.

When the stator is assembled, the three cooperating internal arc 108 encircle and mold the axial shaft 26. A locking rib 98 inwardly protruding from each internal arc engages to one of the three peripherally disposed and axially extending shaft groove 99 and provides locking of the stator 50 against rotation on the shaft 26.

Magnetic isolation of the stator members 84a,84b,84c is ensured by the intercalating isolation spacers 86 between stator members 84a,84b,84c. Each isolation spacer 86 is made of a non magnetic material which in this case is fiberglass but could also be thermoplastic material or aluminum. The isolation spacers 86 are inserted between two adjacent side panels 92 from adjacent stator members 84a,84b,84c. The stator 50 is assembled by using bolts with nuts 88 fastening each isolation spacer 86 with is two adjoining side panels 92.

Figure 7:
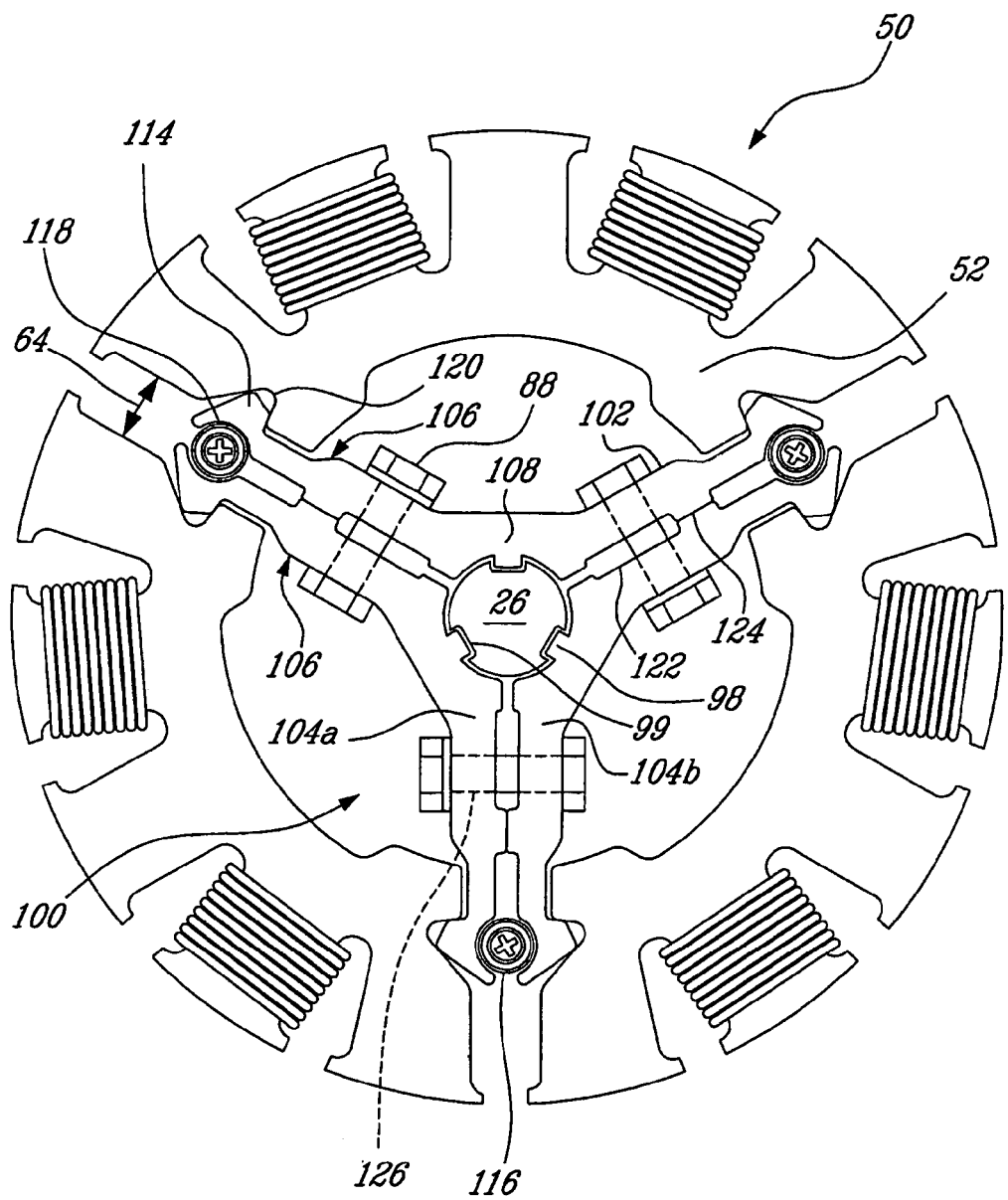
FIG. 7 is a cross-sectional view of a stator frame holding stator sections according to another embodiment of the invention.

FIG. 7 illustrates an alternative stator frame. In this other embodiment of the invention, the stator frame is a flange assembly 100 that holds and spaces the stator sections 52 and fixes the isolation air-gaps 64. It comprises three flanges 102 in an opened-L shape with a 120-degree angle. The flanges are assembled to create a 3-branch Y structure by fastening each two adjacent flanges using bolts with nuts 88 passing through a pair of adjoining L-bars. The central axis of the flange assembly 100 matches the stator axis and the distal end of each of its branch 104 intercalates between two stator sections 52.

Each flange 102 is a non magnetic material member that consists of two arms 106 arranged with a 120-degree angle which proximal ends are joint by a bridge segment 108. In this case, the flanges 102 are made of aluminum alloy but other non magnetic materials including fiberglass and thermoplastic could have been used.

The surface of the bridge segment facing the axis is in the shape of a circular arc and the three cooperating bridge segments 108 encircle and mold the axial shaft 26. A locking rib 98 protruding from the circular arc surface of each bridge segment 108 engages to one of the three peripherally disposed and axially extending shaft groove 99 and provides locking of the flange assembly against rotation on the shaft 26.

A recess 122 in the facing surfaces of each two cooperating arms extends radially on each side of the bolts with nuts fixation point 126 and to the proximal end of each arm 106. Arms lean against each other on only one radial segment 124 located between the distal end of the flange arm 106 and the bolts with nuts 88 fixation point. Among other things, the recess 122 gives the required mechanical clearance for fitting of the flange assembly 100 on the shaft 26 by fastening the bolts with nut 88.

The distal end of each flange arm 106 is a hook-shaped key 114 that, cooperating with its corresponding symmetrical part from its adjoining arm 106, creates an expansion bolt receiving cavity 116 inserted between two stator sections 52. The outer surface of each hook-shaped key 114 engages in a corresponding axial locking track 120 in each stator section 52 and locks the stator section 52 radially relative to the arm 106.

The flange assembly 100 holds the stator sections 52 by insertion of an expansion bolt 118 in each of the three expansion bolt receiving cavity 116. Setting of the expansion bolts 118 firmly expands the hook-shaped keys 114 by pivoting of the distal of each arm on the radial segment 124 and presses the hook-shaped keys 114 against the locking tracks 120 to firmly hold the stator sections 52. The recess 122 allows smooth bending of the arms on expansion of the hook-shaped keys 114.

Going back FIG. 2, the stator is mounted in the casing 16a, 16b using the central shaft 26. As described above, the stator 50 is fasten to the shaft 26 using a flange assembly or stator members with assembling features. The rotor is mounted inside the casing 16a, 16b by press fitting in the inner rim 22. The rotor could also have been glued or bolted to the inner rim 22. The casing 16a, 16b is mounted on the shaft 26 and over the stator 50 using the bearings 30 and set in place by screwing the nut 32 on the shaft thread 28, as previously described. Dimensions of the pieces are selected so that the rotor 51 rotates around the stator 50 with an even radial rotor-to-stator air-gap 62. The wheel motor is attached to the vehicle using the shaft 26.

The stator sections or stator members could be made of laminated magnetic materials instead of pressed ferromagnetic powder or of a combination of the two. One advantage of using ferromagnetic powder is that it can offer a smoother stator tooth cross-section which is harmless on the coils. In the present invention, separation of the stator in multiple stator sections reduces the size of the parts to be manufactured and is thus well adapted for pressing since the requirement on the size of the pressing machine is reduced.

It can be understood from the later description that the described electrical motor could be used for various applications including golf karts, wheelchairs, off-road vehicles, in-hospital transportation, in-factory transportation, in-airport transportation, lawn tractors, etc. Furthermore, the described electrical motor is not limited to vehicle applications and it could be used for any other applications such as industrial applications, etc. A different frame would then be required to assemble the rotor and the stator for relative rotation. For other wheel motor applications the wheel frame could be a non-demountable rim assembly or any other demountable rim assembly if it at least assembles the rotor and the stator for relative rotation.

Also, the stator could be assembled using any other type of stator frame that would fastened the stator sections together without compromising the magnetic isolation of the stator sections. Assembling using flange assembly or stator members with assembling features have been described herein but another appropriate stator frame could be in the shape of an outer disk for attaching the stator sections thereon or in the shape of an interior circular frame or brackets for screwing or bolting the stator sections thereon.

The embodiments of the invention described above are intended to be exemplary only. The scope of the invention is therefore intended to be limited solely by the scope of the appended claims.

What is claimed is:

1. A wheel motor comprising:
a first element having:
teeth, separated by slots, equidistantly disposed in a first circular array along said first element, proximate ones of said teeth being grouped into at least three magnetically isolated sections, each one of said sections having an equal number of said teeth, a distance between adjacent teeth on separate adjacent sections being equal to a distance between adjacent teeth on a same section, all of said slots having an identical shape; and
phases;
wherein a number of said sections is one of a number of said phases and a multiple of said number of said phases;
wherein each one of said sections holds only one of said phases; and
a second element having magnets equidistantly disposed in a second circular array along said second element; and
a wheel frame for concentrically mounting said first element and said second element and allowing rotation thereof relative to each other, said first array of electromagnet poles facing said second array of magnets with a constant air-gap;
wherein a number of said teeth on each one of said sections is an odd number of at least three and a difference between a total number of said teeth and a number of said magnets is one.

2. A rotary multi-phase electrical motor comprising:
a first element having:
teeth, separated by slots, equidistantly disposed in a first circular array along said first element, proximate ones of said teeth being grouped into at least three magnetically isolated sections, each one of said sections having an equal number of said teeth, said equal number on each one of said sections being an odd number of a value of at least three, a distance between adjacent teeth on separate adjacent sections being equal to a distance between adjacent teeth on a same section, all of said slots having an identical shape; and
phases;
wherein a number of said sections is one of a number of said phases and a multiple of said number of said phases;
wherein each one of said sections holds only one of said phases; and
a second element having magnets equidistantly disposed in a second circular array along said second element;
a difference between a total number of said teeth and a number of said magnets being one;
said first element and said second element being concentrically mounted for rotation thereof relative to each other, said first circular array of teeth facing said second circular array of magnets with a constant air-gap.

3. The motor as claimed in claim 2, wherein a value of said total number of said teeth is fifteen and a value of said number of said magnets is fourteen.

4. The motor as claimed in claim 2, said first element further having electrical conductor coils, said teeth being adapted to receive said coils, each one of said coil being coiled around only one of said teeth.

5. The motor as claimed in claim 4, wherein said coils are coiled around alternate ones of said teeth, said slots separating said teeth on said sections each receiving a portion of a single coil.

6. The motor as claimed in claim 5, wherein sections each have one end tooth located at each end thereof, said alternate ones excluding end teeth.

7. The motor as claimed in claim 2, wherein said first element is a stator.

8. The motor as claimed in claim 2, wherein said second element surrounds said first element.

9. The motor as claimed in claim 2, wherein said sections are made using ferromagnetic powder.

10. The motor as claimed in claim 2, wherein a value of said number of said phases is three, thereby providing a rotary three-phase electrical motor.

* * * * *

UNITED STATES PATENT AND TRADEMARK OFFICE
CERTIFICATE OF CORRECTION

PATENT NO. : 7,579,738 B2  Page 1 of 1
APPLICATION NO. : 11/261524
DATED : August 25, 2009
INVENTOR(S) : Cros et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 589 days.

Signed and Sealed this

Fourteenth Day of September, 2010

David J. Kappos
*Director of the United States Patent and Trademark Office*